United States Patent [19]
Barton et al.

[11] Patent Number: 6,138,313
[45] Date of Patent: Oct. 31, 2000

[54] PAINT BRUSH WITH IMPROVED GRIP CONSTRUCTION AND METHOD OF MANUFACTURE THEREOF

[75] Inventors: William W. Barton, Greendale; Anthony W. Gilbert; Paul H. Mylander, both of New Berlin; Bruce C. Polzin, Greendale; Robert A. Shaffer, Kenosha; James J. Jarecki, deceased, late of Greendale, all of Wis., by Eileen J. Jarecki, executor

[73] Assignee: Newell Operating Company, Freeport, Ill.

[21] Appl. No.: 08/841,271

[22] Filed: Apr. 29, 1997

Related U.S. Application Data

[63] Continuation of application No. 08/513,273, Aug. 10, 1995, abandoned.

[51] Int. Cl.⁷ ..................................................... A46B 5/02
[52] U.S. Cl. ............................. 15/143.1; 15/160; 15/174; 15/DIG. 4
[58] Field of Search ................................ 15/143.1, 159.1, 15/160, 174, 188, DIG. 4; 16/116 R; 7/105, 167

[56] References Cited

U.S. PATENT DOCUMENTS

| | | | |
|---|---|---|---|
| 412,479 | 10/1889 | Davis | 15/143.1 |
| 1,687,335 | 10/1928 | Jackline | 15/143.1 |
| 2,237,969 | 4/1941 | Olsen | 15/143.1 |
| 2,426,315 | 8/1947 | Marick | 15/159.1 |
| 2,664,582 | 1/1954 | Kammann | 15/143.1 |
| 3,023,439 | 3/1962 | Danley | 15/143.1 |
| 3,067,446 | 12/1962 | McGauley | 15/143.1 |
| 3,153,801 | 10/1964 | Weiss et al. | 15/143.1 |
| 3,819,779 | 6/1974 | Pharris et al. | 15/143.1 |
| 4,495,669 | 1/1985 | Hooper | 15/143.1 |
| 4,751,762 | 6/1988 | Meimeteas | 15/143.1 |
| 4,847,939 | 7/1989 | Derencsenyi et al. | 15/143.1 |
| 5,339,482 | 8/1994 | Desimone et al. | |
| 5,446,941 | 9/1995 | Kelsay | 15/143.1 |
| 5,615,445 | 4/1997 | Kelsay et al. | 15/143.1 |
| 5,761,759 | 6/1998 | Leversby et al. | |
| 5,920,943 | 7/1999 | Barker | 15/143.1 |

FOREIGN PATENT DOCUMENTS

| | | |
|---|---|---|
| 27 35 542 A1 | 2/1979 | Germany. |
| WO 93/16848 | 9/1993 | Germany. |
| 42 29 152 A1 | 3/1994 | Germany. |
| 3-136775 | 6/1991 | Japan. |
| Y2-6-14846 | 4/1994 | Japan. |
| 6-226193 | 8/1994 | Japan. |
| 6-60473 0 U | 8/1994 | Japan. |
| 6-71082 0 U | 10/1994 | Japan. |
| 6-85778 0 U | 12/1994 | Japan. |
| 0351858 | 7/1931 | United Kingdom ............ 15/143.1 |
| 0844124 | 8/1960 | United Kingdom ............ 15/143.1 |
| 2050156 | 1/1981 | United Kingdom ............ 15/143.1 |

*Primary Examiner*—James Hook
*Attorney, Agent, or Firm*—Foley & Lardner

[57] ABSTRACT

A brush handle is disclosed having a core member which is surrounded by a layer of compressible and resilient gripping material of a non-slip nature, the layer of gripping material closely conforming to the contour of the brush handle and being mechanically interlocked to the handle by projections which are integral with the core member and extend into the layer of gripping material, and also at least partially bonded one to the other by heat and or chemicals. A brush having the above described handle sealingly secured to a brush head utilizing the layer of gripping material and a method of manufacturing a brush handle are also disclosed.

31 Claims, 2 Drawing Sheets

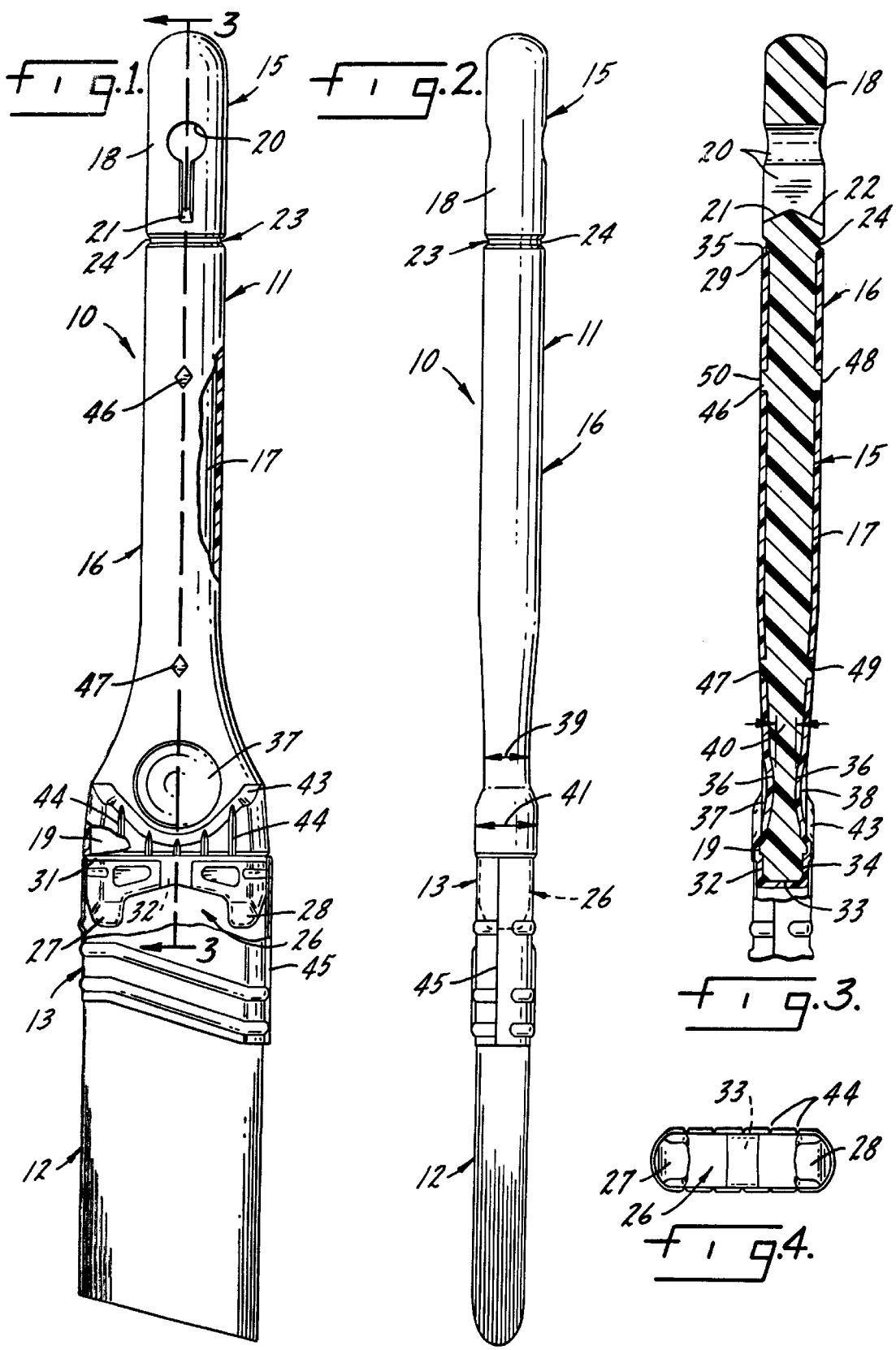

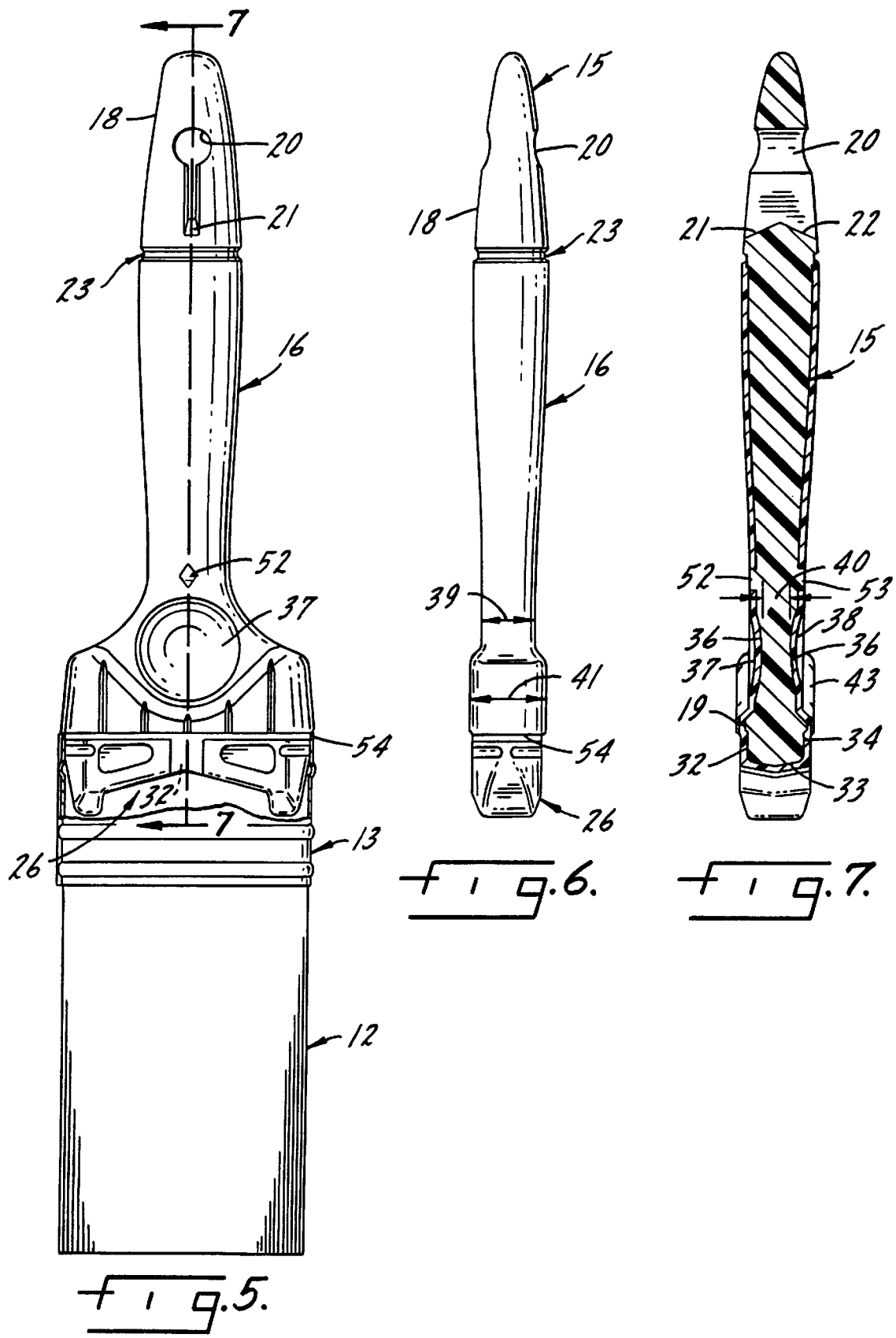

PAINT BRUSH WITH IMPROVED GRIP CONSTRUCTION AND METHOD OF MANUFACTURE THEREOF

This is a continuation of application Ser. No. 08/513,273 filed Aug. 10, 1995 now abandoned.

This invention relates generally to paint applicators, and specifically to paint brush handles, paint brushes and methods of manufacture thereof which result in a handle, and a paint brush, having an improved grip construction and other operational and manufacturing advantages.

BACKGROUND OF THE INVENTION

Currently available paint brushes are usually made with a rigid handle, often wood, but also plastic, to which a series of natural and/or synthetically formed brush filaments are secured, usually with a ferrule at the brush filament-handle junction area, using adhesives, fasteners, such as nails, crimping, or other means. Such brushes are extensively used by do-it-yourself painters who paint on an occasional basis as contrasted to a professional painter or decorator who paints day in and day out. The do-it-yourself painter is thus unaccustomed to the use of hand, wrist and forearm muscles that are called into play in painting with the result that painting becomes a difficult, and sometimes painful, task for such an occasional painter. The same difficulties may not be so pronounced with professional painters but they still are a factor, particularly near the end of a day of painting.

Brush makers have long been cognizant of this problem and attempts have been made to overcome it. The most common approach is to manufacture the brush handle in the form that experience tends to indicate is the most suitable for the specific use for which the brush is intended. Thus, for sash work a long straight handle has been preferred. For general painting purposes a semi-beaver tail contour has been widely used, and for large, wide surfaces, such as exterior siding, a full beaver tail contour has been preferred. Although these shapes do result in a rough match between the applicator and the painting task when such factors as flow and rate of spreadability are considered, nearly all styles include a handle made of a relatively hard, rigid material, such as varnished wood or hard plastic, and hence the problem of hand and forearm fatigue remains a significant drawback. Although attempts have been made to provide a brush having a less taxing operational characteristic, no system which is applicable to all handle contours and which combines sureness of grip, gentleness of contact with the user's hand and ease of use (in the sense of decreasing hand, wrist and forearm pain and stiffness in lengthy painting tasks) has come into widespread use.

Another general problem common to many if not the great majority of brushes currently in use is the degradation of the brush during use with consequent deleterious effects on both the brush, the user and the painting surface. For example, in many if not the great majority of current brushes the ferrule at the brush filament-handle junction area works loose and paint can enter the opened areas and solidify. And in use, water, solvent, or paint, or combinations thereof, which have entered the opened spaces, are able to re-emerge and run down the handle toward the user's hand, thus making a mess and possibly dripping an unwanted color onto a freshly painted surface.

A further annoying and dangerous problem occurs when portions of the end of the ferrule nearest the handle are dislodged from their normal lay-flat position, thus presenting an exposed sharp edge. This is particularly serious when the terminal exposed edge with its associated sharp upper corner is displaced away from a snug fitting relationship with the upper end of the brush filaments and/or the lower, concealed end of the brush handle. Such an exposed edge or sharp corner can easily cut the flesh of the user when in sliding contact with the user's hand.

And finally it is well known that no system for providing the above described desirable attributes and avoiding the above described drawbacks which is adaptable to the mass production of brushes has been proposed, let alone entered the marketplace.

SUMMARY OF THE INVENTION

The invention is a paint brush, including a handle, and a handle per se, together with a method of manufacturing same, which results in a product which significantly reduces fatigue of the user during use, provides a sure grip with consequent excellent control over the head of the brush filaments during paint application, is applicable to brushes of all specialized uses and handle contours from sash to siding, and feels comfortable in the hand of the user, yet which can be produced at a very modest cost so that mass produced brushes may enjoy the aforesaid significant advantages. Said advantages result from the provision of a thin layer of material having the characteristics with respect to compressibility and flexibility of rubber-like material or soft plastic which is preferably formed as an independent molded product about a hard handle core. Preferably the thin layer is a thermoplastic elastomer and the core is a material compatible with the exterior layer in the sense that a good chemical and/or heat bond as well as a mechanical connection is formed between the thin resilient layer and the hard core. The handle is formed in a two stage injection process in which the core member formed in the first stage includes spacer means which fix the position of the core member in a subsequent molding cavity so that, upon injection of the resilient layer under the necessarily high injection pressures required in such operations to form the thin layer of resilient material, the core will remain perfectly spaced from the surface of the second mold cavity whereby the desired thickness is provided at all locations. The invention further includes application of the resilient layer at the junction area of the ferrule with the handle in such fashion that problems resulting from separation of the ferrule from the balance of the brush are eliminated during normal use to which the brush will be subjected.

Other objects and advantages of the invention will become apparent from the following description of the invention.

BRIEF DESCRIPTION OF THE DRAWING

The invention is illustrated more or less diagrammatically in the accompanying drawing wherein.

FIG. 1 is a top plan view of a brush, here a sash brush having a straight handle, with parts broken away for clarity;

FIG. 2 is a right side view of the brush of FIG. 1;

FIG. 3 is a section taken substantially along the line 3—3 of FIG. 1;

FIG. 4 is a front end view of a brush handle of the invention, the ferrule and brush filaments having been omitted;

FIG. 5 is a top plan of an alternative form of a brush, here a semi-beaver tail general purpose brush, with a portion of the ferrule broken away for clarity;

FIG. 6 is a right side view of a handle assembly of the brush of FIG. 5; and

FIG. 7 is a section taken substantially along the line 7—7 of FIG. 5.

DETAILED DESCRIPTION OF THE INVENTION

Like reference numerals will be referenced to like parts from Figure to Figure in the description of the drawing.

Referring first to FIG. 1, a brush, here a sash brush, is indicated generally at 10. The brush 10 includes a handle, indicated generally at 11, a brush head, indicated generally at 12, at the distal end of the handle, and a means for securing the brush head to the handle in operative relationship, here a ferrule, indicated generally at 13.

The handle 11 includes a core, indicated generally at 15, see FIG. 3 particularly, and a thin covering layer, indicated generally at 16, said covering layer having the characteristics, with respect to compressibility and resiliency, of rubber-like material or soft plastic. The core 15 is formed from a relatively hard material, preferably plastic, which provides strength and stiffness to the brush. The core includes a shank portion 17 which terminates at its upper end in hang portion 18 at the proximate end of the handle and, at its lower end, in a width expanded connecting portion 19. Hang portion 18 has, in this instance, a key hole shaped hang slot 20, the bottom of which is formed with inclined surfaces 21, 22, see FIG. 3, which form an apex at the center for easily assembly to a hang structure, such as a peg board hook or extended wire or Q-bic blade. The hang portion 18 is set off from shank portion 17 by a circular channel indicated generally at 23, the bottom 24 of the channel 23 extending outwardly from the central axis of the handle a slightly greater distance than the upper end of the shank portion 17 of the handle for a purpose which will appear hereafter.

The lower expanded portion 19 of the handle terminates in a plug-in section of the ferrule cavity indicated generally at 26 which is received at the upper end of ferrule 13 in a conventional manner, the plug section including side prongs 27, 28.

The covering 16 is composed of a material having the characteristics with respect to compressibility, resiliency and flexibility of rubber-like material or soft plastic. As best seen in FIGS. 1 and 3 the covering 16 extends from the channel 23 downwardly over all the exposed surface area of the shank portion 17 and expanded portion 19 of the core, with one exception to be described hereafter, above the top of ferrule 13. It will be noted from FIG. 1 that, in addition, the covering extends in a narrow band 31 along the upper end of the plug section 26 of the core, the narrow band 31 being located within the upper edge portion of the ferrule. It will be seen from FIG. 1 particularly that the width of the band 31 is slightly shorter than the width of the covering 16 at the lowest point of the expanded portion 19 of the core. Since the width dimension of the lower end of the covering on the expanded portion 19 of the core 15 is equal to or, preferably, slighter greater than the thickness of the ferrule 13, the joining surfaces of the covering 16 and the narrow band 31 form a recess having a depth, in a width direction, at least as great as the thickness of the ferrule. Thus the narrow band 31 and the adjacent shoulder on the covering form a seal with the upper end of the ferrule, which seal precludes entry of fluids into the interior of the ferrule, or the leakage of paint or other applied coating, upwardly over the upper edge of the ferrule from its interior.

The covering 16 extends downwardly in a suitable recess in the center of the core as at 32, loops under the bottom center of the core at 33, see FIG. 3, and extends upwardly, as at 34, in a suitable recess on the bottom side of the core, see FIG. 3, to form a loop connector between the covering on the top and bottom sides of the core which mechanically precludes separation of the covering from the core.

The upper edge of the covering 16, indicated at 35, partially abuts against a shoulder 29 formed just below channel 24 whereby slippage of the covering 16 toward the hang portion 18 is resisted.

A finger grip indentation is formed in the lower end of the handle in the junction area between the shank portion 17 and the expanded portion 19 of the core on both sides of the handle as best seen in FIG. 3. Concave areas 37, 38, of covering 16 follow the contour of the finger grips 36 so that the user may place his thumb and forefinger into the two finger grips 37, 38 during use. This placement of the finger grips 37, 38 in the illustrated very close juxtaposition with the bottom of the handle and top of the ferrule provides near-maximum control of the brush head 12 by the user during coating application. The locations of the finger grips further ease the muscle strains which manipulation of a paint brush entails in that the grips provide a more natural less stressful position for the hand to occupy during manipulation of the brush head 12 during coating; i.e.: as contrasted to the conventional wider spacing usually found on current brushes. By reference to a straight cylinder handle as the most disadvantageous grip construction, it will be appreciated that the herein disclosed configuration consisting of, firstly, a barrel section to accommodate the wrap of the last three fingers of the user's hand, in conjunction with, secondly, the finger grips 37, 38, provide the most natural and therefore the least tiring hand gripping configuration.

From FIGS. 2 and 3 it will be noted that the thickness 39 of the junction area between the shank portion 17 and the expanded portion 19 of the core is less than the thickness of the bottom portion 19 of the core. By providing a thickness 36 between the finger grips 37, 38, which is only thick enough to provide the minimum required rigidity and structural integrity to the brush, brush filament control is enhanced because of the relatively small distance between the thumb and forefinger of the user in operation as contrasted to the spacing between the thumb and forefinger in a conventional brush handle. It will be appreciated that the closer the two digits of the human hand are placed during a manipulating movement of the hand, the finer the degree of control the user has over the gripped object. The crescent shaped inclined surface 43 on the lower portion of the handle functions as an aesthetically pleasing transition section between the narrow dimension represented by the thickness 39 in the finger grip area and the substantially greater dimension 41 in the ferrule-handle joinder area. Other configurations, including a sharp right angle, could be used however. A plurality of grooves are indicated at 44 in the cover 16. The grooves 44 provide a thumb rest for the user in the event the user finds it more comfortable during use to place his thumb on the bottom portion 19 of the handle than in a finger grip 37, 38. The grooves also function as a means for preventing slippage of the user's thumb, or other finger, which may rest thereon in preference to one of the grips 37, 38. Said grooves are aesthetically pleasing to the eye but, from a functional standpoint, they could be replaced by numerous other constructions, including dimpled depressions or a knurled configuration.

The ferrule 13 is of conventional construction and is applied in conventional fashion to the lower end of the handle, the exposed vertical edge of the ferrule being indicated at 45. In this instance the ferrule has been secured by crimping to the brush head 12 and handle 11, though nails could be used.

A particularly unique feature of the invention is illustrated in FIGS. 1 and 3 by the core projections 46, 47, 48 and 49. As best seen in FIG. 3, projections 48 and 49 extend outwardly to the plane of the surface of cover layer 16. The projections are preferably formed integrally with the core 15 during the core molding operation. The projections are here shown as diamond shaped, see FIG. 1, but it will be appreciated that virtually any contour is feasible, including a circle. The protrusions greatly facilitate the manufacturing process in that they make possible the production of a uniform product at a high rate of speed, and thus make the invention available at a price which the mass market consumer can afford. The protrusions, here diamond shaped, also function as a further mechanical interlock between the core 15 and the covering layer 16 to thereby prevent slippage between the core 15 and the cover layer 16.

Specifically, after molding the core, including the projections 46–49, the thus formed core is placed in a second mold cavity and the cover layer 16 injection molded is about the core 15. In view of the thinness of the cover layer 16 and the long distance the hot injection material must flow, and the resultant requisite high pressures encountered during the cover molding step, the core 15 must be braced away from the surface of the mold cavity to ensure that the cover layer material envelopes the core to the desired thickness at all locations. The projection 46–49 serve to locate the core 15 at the desired position within the second molding cavity, the projections thereby functioning in effect as spacers to maintain the core in a precise, pre-determined position with respect to the second molding cavity. The projections are here configured so that the surfaces thereof, as indicated at 50, see FIG. 3, abut the wall of the second molding cavity so that injected material may flow around the projections as indicated in FIGS. 1 and 3 but not between the surfaces of the projections and the surface of the mold cavity. As a consequence the surfaces of the projections are flush with the surface of cover layer 16 and provide an eye-pleasing, decorative appearance.

Referring now to the embodiment of FIGS. 5–7 it will be seen that a general purpose semi-beaver tail varnish or wall brush is there illustrated. Similar reference numerals have been used to refer to parts which are the same as or similar to the corresponding parts illustrated in FIGS. 1–4.

In this instance only a single pair of protrusions 52, 53, have been used for the reason that the core is sufficiently short that it may be maintained spaced from the wall of the second cavity with only said pair of protrusions.

In this instance also the lower edge of the exposed portion of cover 16 in its final condition projects outwardly beyond the thickness of the ferrule 13 a significant amount, as indicated in 59. Thus even if the ferrule should work loose slightly at its upper edge, said upper edge will still be within, or aligned with, the exterior dimension of the cover 16 and thus the risk of injury to the user, or the ingress or egress of paint, solvent or other liquid between the cover 16 and the ferrule 15, will be decreased over the structure illustrated in FIGS. 1–4.

The thickness of the soft grip covering 16 will vary from a thickness of on the order of from about 0.030 inches to about 0.125 inches. Below 0.030 inches it will be difficult to push the material over the length of the core 15 through such a small space. If the cover material is thicker than about 0.125 inches the flow will be excellent, but the final structure may be too flexible for easy use, and the cost would increase considerably since the cover material is more costly than the material from which core 15 is made. More preferably, the thickness of the cover material 30 should be on the order of from about 0.050 inches to about 0.075 inches.

The core material is preferably polypropylene. The preferred over-grip or cover grip material is a thermoplastic elastomer (TPE). An example would be Santoprene, which is a polypropylene based TPE with vulcanized rubber dispersed in it. Since both materials are polypropylene based, there will be a better chemical and/or heat bond between both substrates than there would be with dissimilar materials. It will be understood that a bond may be formed by heat fusion or chemical reaction or both heat fusion and chemical reaction depending on the specific materials, times, temperatures and pressures utilized. Most preferably the cover 16 is secured to core 15 not only by the mechanical interlocks but also, to some degree, by a bond provided by heat and/or chemical means.

Other materials could be used for the core material, such as a polyethylene with the Santoprene TPE over-grip. Both materials are in the polyolefin family and would bond and work, but probably not as well as the same material based components. Other base materials such as blends of polypropylene and polyethylene could also be used.

Still other material combinations could be used. For example, Krayton is a styrene based TPE which could be used. It would not be as effective as Santoprene since the base material is styrene which does not have nearly as good solvent resistance to paint solvents as does Santoprene. It would be acceptable for latex or water based systems but not solvent based coatings. Polyvinylchloride (PVC) can also be used but like Krayton the PVC has limited resistance to non-water based solvents. A number of other core and over-grip materials could be used to make this type of brush handle but the materials described above both have a relatively high resistance to all paint solvents and a low manufacturing cost for an integrally molded handle.

As mentioned, the foregoing description pertains to a two-shot molded handle. Other handle designs could also be used such as sliding a premolded sleeve of a grip material over a core handle. A TPE, PVC, polyester or urethane foam or even a rubber material could be slid over a core handle. This slide on could be similar to a bicycle handgrip or it could be mechanically trapped in a recess but significant disadvantages to said alternative processes exist to the point where the illustrated and described construction is much preferred.

Although a preferred embodiment of the invention has been illustrated and described in the foregoing specification, it will at once be apparent to those skilled in the art that the modifications and improvements may be made. Accordingly it is intended that the scope of the invention be defined by the scope of the hereafter appended claims when interpreted in light of the relevant prior art, and not by the scope of the foregoing exemplary description.

What is claimed is:

1. A paint applicator handle said paint applicator handle being substantially solid to thereby provide rigidity and having a proximate end and a distal end, and a thumb and finger control means located closely adjacent the distal end of the handle, said control means including a first depression having a center and a plurality of side surface portions spaced less than 180 degrees about the center, wherein the first depression is of a size large enough to comfortably receive the thumb or a finger between the side surface portions of a user during use, whereby the side surface portions contact the thumb or finger to retain the thumb or finger proximate the center.

2. The paint applicator handle of claim 1 further characterized in that the handle has a thickness, wherein the thickness in the region adjacent the first depression center is thinner than the portions of the handle remote from said generally centrally located portion.

3. The paint applicator handle of claim 1 wherein the plurality of side surface portions substantially surround the depression.

4. The paint applicator handle of claim 1 wherein the control means includes a second depression on an opposite side of the handle, the depression having a center and a plurality of side surface portions spaced less than 180 degrees about the center, wherein the second depression is of a size large enough to comfortably receive the thumb or a finger of a user during use, whereby the side surface portions contact the thumb or finger to retain the thumb or finger proximate the center.

5. The paint applicator handle of claim 1, including a layer of gripping material overlying at least the center, wherein the layer of gripping material has a sufficient thickness such that the layer of gripping material is compressible and flexible similar to that of a rubber-like material or soft plastic.

6. A paint brush comprising:
    said paint applicator having a proximal end and a distal end,
    said distal end being adapted to be secured to brush head means,
    a handle having a proximal end and a distal end;
    a plurality of brush filaments extending along parallel axes and formed into a group of bristles;
    a ferrule coupling the bristles to the distal end of the brush handle, the ferrule having a length extending substantially perpendicular to the axes of the brush filaments;
    a thumb and finger control means located closely adjacent the distal end of the handle,
    said control means including an arcuate inclined surface extending tangent to the ferrule length, wherein the inclined surface is of a size large enough to partially surround the thumb or a finger of a user to retain the thumb or finger in place during use.

7. The paint applicator handle of claim 6 wherein the plurality of side surface portions substantially surround the depression.

8. The paint applicator handle of claim 6 wherein the control means includes a depression, the depression having a center and a plurality of side surface portions spaced less than 180 degrees about the center, wherein the depression is of a size large enough to comfortably receive the thumb or a finger of a user during use, whereby the side surface portions contact the thumb or finger to retain the thumb or finger proximate the center.

9. A brush
    said brush including a brush handle
    said brush handle having a proximal end and a distal end
    said distal end being adapted to be secured to brush head means
    said handle having core means which provides strength and rigidity to the handle and which extends from its proximal end portion to its distal end,
    said handle further having a layer of solvent resistant gripping material overlying at least a substantial portion of the core means,
    said layer of gripping material having a thickness sufficient such that the layer has the characteristics with respect to compressibility and flexibility of rubber-like material or soft plastic,
    means for interlocking the core means and the layer of gripping material both radially and axially,
    said interlocking means being a mechanical interlock, and
    brush head means, said brush head means including
    a plurality of brush filaments formed into a group of bristles suitable for use in coating applications, and
    a ferrule securing the upper end portion of the group of brush filaments to the distal end portion of the brush handle.

10. The brush of claim 9 further characterized in that
    a distal end portion of said layer of gripping material forms a seal with the ferrule.

11. The brush of claim 10 further characterized in that said distal end portion of the layer of gripping material which forms a seal with the ferrule extends outwardly beyond the upper edge of the ferrule
    to thereby preclude contact between the upper edge of the ferrule and the flesh of a user.

12. The brush of claim 11 further characterized by and including
    a thumb and finger control means located closely adjacent the distal end of the handle,
    said control means including a depression having a center and a plurality of side surface portions spaced less than 180 degrees about the center, wherein the depression of a size large enough to comfortably receive the thumb or finger of a user during use, whereby the side surface portions contact the thumb or finger to retain the thumb or finger proximate the center.

13. The brush of claim 12 further characterized in that said layer of gripping material extends into the depression.

14. A method of forming brush handles, the method including the steps of:
    forming a core member having the requisite strength and rigidity of a brush handle, wherein the core member has an outer surface including at least a base material;
    said forming step including simultaneous forming of an integral projection means extending outwardly from the main body of the core member;
    positioning of the core member and its integral projection means in a forming cavity;
    forming at least one layer of a gripping material completely about the projection means and at least a substantial portion of the core member, wherein the at least one layer has a thickness sufficient such that the layer has the characteristics with respect to compressibility and flexibility of rubber-like material or soft plastic, and wherein the gripping material includes the base material;
    whereby a mechanical interlock is formed between the layer of gripping material and projection means which resists relative movement of the core member and the layer of gripping material both radially and axially; and
    heat fusing the layers to the outer surface of the core, whereby the fused base materials of the layer and the core and the mechanical interlock retain the at least one layer about the core when exposed to harsh solvents.

15. The method of claim 14 further characterized in that the length of the outward extension of the integral projection means is equal to the thickness of the layer of gripping material
    whereby the exposed surface of the projection means is flush with the surface of the layer of gripping material.

16. The method of claim 15 further characterized in that at least a partial bond is formed between the core member and layer of gripping material during the second forming step.

17. A paint applicator,
said paint applicator including a handle having a proximal end and a distal end,
said distal end being adapted to be secured to paint applicator head means,
said handle having core means which provides strength and rigidity to the handle and which extends from its proximal end portion to its distal end,
said handle further having a layer of gripping material overlying at least a substantial portion of the core means,
said layer of gripping material having a thickness sufficient such that the layer has the characteristics with respect to compressibility, flexibility and non-slip characteristics of rubber-like material or soft plastic,
means for interlocking the core means and the layer of gripping material radially and axially with respect to the handle,
said interlocking means being a mechanical interlock,
a plurality of brush filaments formed into a group of bristles suitable for use in coating applications, and
a ferrule securing the upper end portion of the group of brush filaments to the distal end portion of the brush handle.

18. The paint applicator handle of claim 17 further characterized in that the mechanical interlock includes projection means extending outwardly from the core means.

19. The paint applicator handle of claim 18 further characterized in that said projection means are flush with the surface of the layer of gripping material.

20. The paint applicator handle of claim 19 further characterized in that the core and gripping material are at least partially bonded to one another.

21. The paint applicator handle of claim 20 further characterized in that the core and gripping material are heat bonded to one another.

22. The paint applicator handle of claim 17 further characterized by and including a thumb and finger control means located closely adjacent the distal end of the handle,
said control means being a depression having a center and a plurality of side surface portions spaced less than 180 degrees about the center, wherein the depression is of a size large enough to comfortably receive the thumb or a finger of a user during use,
said layer of gripping material extending into each depression.

23. The paint applicator handle of claim 22 further characterized in that the core means has a thickness, wherein the thickness in the region adjacent the depression center is less than the thickness of the core means at the locations more remote from the distal end of the handle.

24. The paint applicator handle of claim 17 further characterized in that at least a portion of the layer of gripping material extends around the distal end portion of the handle.

25. The paint applicator handle of claim 17 further including means, at the distal end of the handle, for securing the handle to the upper end portion of brush head means
said securing means including seal means adapted to form a seal with the proximal end of said brush head means.

26. A paint applicator comprising:
a paint retaining and releasing medium for applying paint to a surface; and a handle coupled to the medium, the handle including:
a rigid core; and
a layer of solvent resistant gripping material overlying at least a substantial portion of the core, the layer of gripping material having a thickness sufficient such that the layer has the characteristics with respect to compressibility and flexibility of rubber-like material or soft plastic, wherein the gripping material is sufficiently resistant to the following solvents so as to experience a weight change of less than 40 percent following ASTM test procedure D-471:
98% Sulfuric Acid;
10% Hydrochloric Acid;
50% Sodium Hydroxide;
10% Potassium Hydroxide;
Water;
Ethanol;
n-Hexane;
Methylethylketone;
Acetone;
Mineral Spirits
n-Octane; and
n-Pentane.

27. The paint applicator of claim 17 wherein the mechanical interlock comprises a projection integrally formed as part of a unitary body with the core means, wherein the projection is surrounded by the layer of gripping material.

28. The paint applicator of claim 27 wherein the layer of gripping material has an inner surface proximate the core means and an outer surface distant the core means, and wherein the projection terminates along a surface flush with the outer surface of the layer of gripping material.

29. A brush comprising:
a brush handle having a proximal end and a distal end, the distal end including a layer of soft flexible rubber-like material, wherein the layer defines a band and a shoulder extending above the band;
a plurality of brush filaments formed into a group of bristles suitable for use in coating applications; and
a ferrule coupling the bristles to the distal end of the brush handle, the ferrule being compressed against the band and the shoulder to form a seal between the distal end of the brush handle and the ferrule.

30. A brush comprising:
a handle having a proximal end and a distal end, the handle including:
a rigid core; and
a layer of gripping material overlying at least a substantial portion of the core, the layer of gripping material being formed of a compressible material and having a sufficient thickness so as to be compressible; and
a brush head coupled to the handle and including:
a plurality of brush filaments formed into a self-sustaining group of bristles; and
a ferrule extending about the self-sustaining group of bristles and extending adjacent to the distal end of the brush handle, wherein the ferrule is compressed against the layer of gripping material proximate to the distal end of the brush handle to form a seal between the ferrule and the distal end of the brush handle.

31. The brush of claim 30 wherein the layer of gripping material proximate the distal end of the handle forms a band and a shoulder non-parallel above the band and wherein the ferrule is compressed against the band and the shoulder to form the seal.

* * * * *